June 13, 1967 D. T. BURNS ET AL 3,324,681

MOUNTING OF BEARING RACES IN A UNIVERSAL JOINT MEMBER

Filed Aug. 16, 1965

INVENTOR.
DONALD T. BURNS
RONALD D. HONSBERGER
BY Walter E. Pavlick
Harold D. Hall
ATTORNEYS

United States Patent Office 3,324,681
Patented June 13, 1967

3,324,681
MOUNTING OF BEARING RACES IN A
UNIVERSAL JOINT MEMBER
Donald T. Burns, Toledo, Ohio, and Ronald D. Honsberger, Marion, Ind., assignors to Dana Corporation, Toledo, Ohio, a corporation of Virginia
Filed Aug. 16, 1965, Ser. No. 479,831
10 Claims. (Cl. 64—17)

This invention relates generally to universal joints utilizing a journal cross mounted in bearing races carried by the universal joint members and is more particularly directed to such a joint including means for reducing clearance between the thrust faces of the trunnions of the journal cross and the thrust faces of the bearing races mounting the same so that these thrust faces have a substantially touching, that is, closely spaced, and yet free play relationship, such free play being in a rotational sense.

Universal joints, of the commonly referred to Cardan type, conventionally comprise a pair of members each having an axis of rotation and having juxtaposed ends joined in a torque transmitting relationship by articulating means, such as a journal cross, drivingly secured to each member in such a manner as to allow angular displacement of the axes of the members relative to each other during the transfer of torque therebetween.

More particularly, the juxtaposed ends of the members are each provided with a pair of radially spaced and opposed arms extending axially toward the other member, the arms on one member being circumferentially interposed between and spaced 90° from the arms of the other member. A journal cross having four radially extending and circumferentially equally spaced trunnions is disposed intermediate the members with one of the trunnions adapted to be drivingly connected to each of the lugs. In one type of construction concerned with herein, the lugs are provided with openings therethrough which extend in a radial direction when considered with respect to the axis of rotation of the member containing the same, a trunnion is disposed in each opening in a spaced relationship with respect to the lug and a cup shaped bearing race is secured in the opening and disposed intermediate the trunnion and the lug and rotatably mounts the trunnion relative to the lug.

The radially outer portion of the bearing race is enclosed by a transverse wall, and the radially inner surface of the transverse wall and the radially outer surface of the trunnion are adapted to engage each other in a thrusting relationship. Many means are known in the art for securing the bearing races against radial outward movement with respect to the lug thereby inhibiting relative movement of the journal cross radially relative to the members. A few of the well known means for so securing the bearing races comprise a snap ring carried by the lug and abuttingly engaging the bearing race as shown in United States Patent 2,067,283, staking or deforming a portion of the lug into engagement with the bearing race as shown in United States Patent 2,447,882 and securing a resilient means to the lug in a pressing relationship with the bearing race as shown in United States Patents 2,512,691 and 3,062,026.

It is most desirable, especially when the universal joint will operate at high rotational speeds that, once the bearing races and the journal cross are assembled with the joint members, the journal cross and races are maintained as close as possible to the originally assembled relationship with respect to the joint members. For example, if the bearing races can move relative to the lugs, or if excessive clearances are allowed between the thrust faces of the trunnion and bearing race, the bearing race and/or trunnion may shift radially relative to the members mounting the same during service use so that the balancing conventionally performed on the universal joint will be deleteriously affected.

With the conventional snap ring method of assembly, the tolerances build up of the cooperating parts, such as the radial spacing of the lugs and the snap ring grooves, and other tolerances affecting the radial spacing of the thrust surfaces of the bearing races in addition to the tolerances affecting the radial position of the trunnion thrust faces, require that a substantial clearance be allowed between the thrust faces of the trunnions and bearings so that an undesirable accumulation of tolerances does not result in a pressing fit between the thrust faces which inhibits the free play thereof; however, it is well known that the tolerances may accumulate in such a manner that the spacing between the thrust faces is at a maximum or, if the thrust faces are touching, then the bearing race be spaced from its associated snap ring and the journal cross and/or bearing races will be able to shift radially relative to the lug. Such spacing results in a universal joint which is extremely difficult to balance since the journal cross can shift radially with respect to the joint members and, further, the spacings allow undesirable impact engagement between the thrust faces. With the prior art snap ring devices either the tolerances have to be closely maintained or a snap ring of a selected size utilized to obtain the desired spacing.

While the staked type mounting method can provide assemblies with minimum tolerances, such assemblies are difficult, if not impossible, to disassemble for servicing purposes and, thus, require discarding the entire assembly when service is required or remachining of the lug portions for disassembly and subsequent assembly. The use of a resilient member to position the bearing races can under certain conditions, establish the desired clearance relationship between the thrust surfaces; however, such also are difficult to disassemble and subsequently assemble for service requirements and, further, the resilient member is often destroyed in such an operation.

It is therefore, an object of this invention to provide an improved arrangement for mounting the bearing races of a universal joint.

It is another object of this invention to provide such an improved arrangement which results in a substantially touching and free play relationship between the thrust faces of the bearing races and trunnions of the journal cross.

Another object of this invention is to provide an arrangement for mounting the bearing races and journal cross of universal joint members such that the thrust faces thereof are in a substantially touching and free play relationship which joint may be easily disassembled and subsequently assembled.

Yet a further object of this invention is to provide a universal joint, conventionally referred to as the Cardan type, which is easily yet securely constructed in such a manner that it will retain its balanced condition and yet is easily disassembled and subsequently reassembled.

Still another object of this invention is to provide a Cardan type universal joint wherein the machining tolerances need not be closely controlled to consistently achieve a closely spaced or touching yet free play relationship between the bearing race and trunnion thrust faces when the universal joint is completely assembled.

Other and further objects of this invention will become apparent upon a consideration of the following detailed specification when taken in view of the drawings, wherein.

Figure 1:
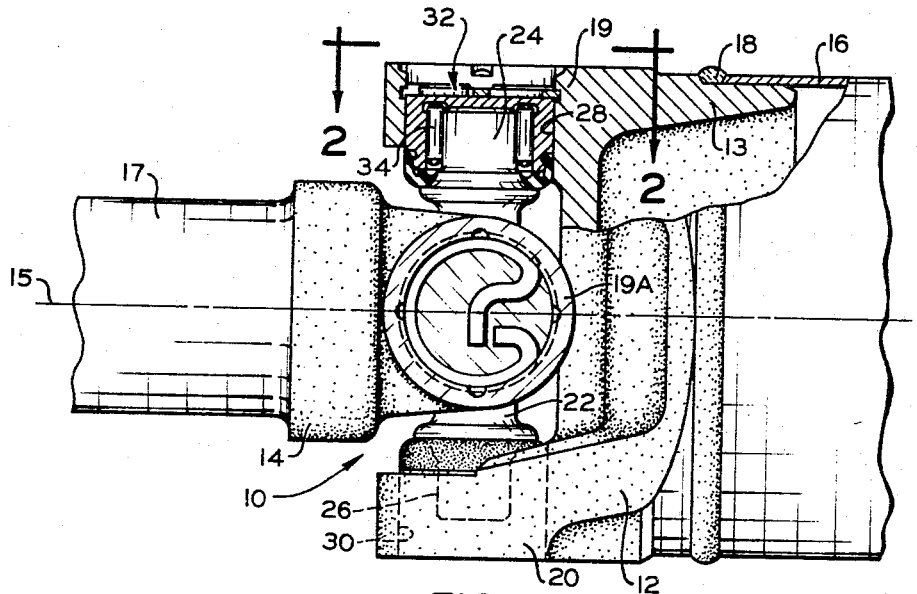
FIG. 1 is a longitudinal elevational view, shown partially in longitudinal section, of a completely assembled universal joint portion of a driveline embodying this invention.

From time to time hereinafter in this specification and the claims which are appended thereto, the terms radial and axial will be used, and it is intended that the term axial shall be construed with reference to the axis of rotation of the aligned universal joint members, and the term radial shall be construed as a direction extending perpendicular with respect to such axis of rotation, unless such terms are specifically defined otherwise.

In a preferred embodiment of this invention a Cardan type universal joint includes a conventional journal cross, circumferentially equally spaced and radially extending uniplanar trunnions positioned in a paired opposed relationship, which trunnions each have a radially extending axis with the radially outer portion thereof surrounded by cup shaped bearing race having a closed radially outer end. A pair of yoke or yoke like members, each provided with a pair of radially spaced and axially extending lugs, are disposed with their lugs in an alternating relationship. Each lug has a radially extending cross hole disposed therein, which cross holes are disposed in a uniplanar and, circumferentially equally spaced relationship when the members are disposed coaxially. Each of the bearing races is disposed in one of the cross holes and a substantially annular snap ring is secured in a receiving opening in the form of a groove machined in the walls defining the cross holes and in an abutting relationship with the radially outer surface of the bearing race. Portions of each lug about the cross holes and radially outwardly of the groove receiving the snap ring are then deformed radially inwardly to, in effect, reshape portions of the groove, so that the reshaped groove positions the snap ring in a pressing relationship with the outer radial surface of the bearing race and maintains the thrust face of the bearing race in a closely spaced relationship with the radial outer end or thrust face of the trunnion. By so reshaping the groove, substantially all radial motion of the bearing race relative to the lugs and radial movement of the journal cross relative to the bearing race is eliminated. Since the above described finally assembled relationship has been achieved by reshaping the groove, the snap ring is still positioned in such groove and can be removed therefrom and reinserted thereinto in a conventional manner.

Referring now to the drawings, a universal joint assembly shown generally at 10 includes a pair of members adapted to transmit torque therebetween while assuming various angular relationships and take the form of a pair of yoke members 12 and 14, with their longitudinal axes 15 disposed coaxially. The yoke 12 is shown as having the axially outer or right end thereof terminating in an annular butt 13 pressed into a portion of a driveline in the form of a tubular element 16 extending axially therefrom and secured thereto as by a peripheral weld 18. The yoke 14 includes an elongated shaft portion 17 which is adapted for conventional attachment to another portion of a driveline (not shown).

The yoke member 12 is provided with a pair of axially inwardly extending lugs 19 and 20 which are disposed in a radially aligned and spaced relationship, while the yoke member 14 is likewise provided with a pair of axially extending lugs, one of which is shown at 19A, which latter lugs are radially aligned and spaced and conventionally positioned in an alternating relationship with the lugs 19 and 20 of the yoke member 12.

A journal cross 22 is provided for drivingly connecting the yoke 12 and 14 in an articulating manner and is conventionally provided with two pair of radially opposed and radially outwardly extending trunnions, a pair of which is shown at 24 and 26.

The lugs 19 and 20 of the member 12 are respectively provided with radially extending openings 28 and 30, which openings are radially aligned and respectively receive the radially outer end of the trunnions 24 and 26 in a spaced relationship. The construction and arrangement of the trunnions of the journal cross 22 and the yoke 12 and 14 will be described with reference to the trunnion 24 and its cooperation with the lug 19 of the yoke 12; it being understood that such description is applicable to the trunnion 26 of the journal cross and the cooperation thereof with the lug 20 of the yoke 12 and that the cooperation between the trunnions of the journal cross and the yoke 14, preferably and as shown in FIG. 1, is the same as that of the trunnion 24 and yoke 12.

Means is provided to rotatably mount the trunnion 24 relative to the lug 19 and takes the form of a bearing race, shown generally at 32, containing an annulus of needle bearings 34. The bearing race 32 includes a radially elongated annular race or wall portion 36 and is closed at its radially outer end by a transverse wall 38 formed integrally with the wall portion 36. The annular wall portion 36 is disposed in the opening 28 and in pressing engagement with the portion of the lug surrounding said opening. Disposed intermediate the wall portion 36 and the periphery of the trunnion 24 are the needle bearings 34 for providing relatively low friction rotation between the trunnion and bearing race. The radially outer end of the trunnion 24 is terminated by a transversely extending and radially outwardly facing thrust surface 40 which is disposed in a cooperative relationship, hereinafter more fully described, with a thrust surface 42 formed on the radially inner surface of the transverse wall 38 of the bearing race 32.

Figure 3:
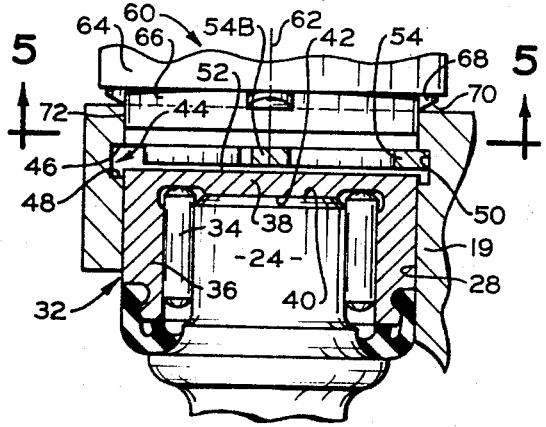
FIG. 3 is a view similar to FIG. 2 showing such portion before an assembling tool, shown fragmentarily and cooperatively positioned with the portion, has been utilized thereon to complete the assembly thereof.
Figure 5:
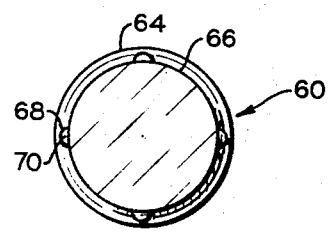
FIG. 5 is an end view of the assembling tool when looking in the direction of the arrows 5—5 in FIG. 3.

Formed within the portion of the lug 19 surrounding the opening 28 therein is a receiving opening of larger diameter than the opening 28 and takes the form of an annular groove, shown generally at 44, having at least a radially inner wall and a peripheral wall 48 and 50 respectively, and also having a radially outer wall 46. Referring to FIG. 3, prior to the completion of the assembly of the universal joint 10, and with the thrust surfaces 40 and 42 disposed in a closely spaced relationship, the radially inner wall 48 of the groove 44 is preferably disposed radially inwardly of the outer surface 52 of the transverse wall 38 of the bearing race 32. A snap ring 54 is disposed within the groove 44 and positioned intermediate the outer surface 52 of the bearing race 32 and the upper wall 46 of the groove; the width of the groove being such that, as shown in FIG. 3, when the thrust surfaces 40 and 42 are disposed in a closely spaced relationship and the snap ring 54 engages the upper wall 46, the snap ring will be at least slightly spaced from the outer surface 52 of the bearing race.

Figure 4:
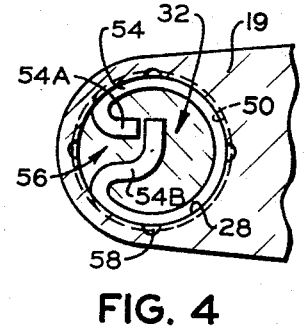
FIG. 4 shows the universal joint of FIG. 1 when viewed as indicated by the arrows 4—4 in FIG. 2.

The snap ring 54 is conventional in form and has a periphery which is substantially circumferentially continuous, except for the portion indicated generally at 56 in FIG. 4 wherein a pair of legs 54A and 54B of the snap ring are deformed radially inwardly with respect to the periphery of the snap ring. The diameter of the continuous circumferential portion of the snap ring 54, when the same is not confined in the groove 40, is greater than the diameter of the groove. Thus, the snap ring 54 may be deformed to a smaller diameter as by manipulating the legs 54A and 54B in a well known manner, and inserted in the groove 44, and, upon release of the deforming load, the periphery of the snap ring pressingly engages the wall 50 of the groove. When the snap ring 54 is disposed in the groove 44 as shown in FIG. 3, that is, prior to the completion of the assembly of the universal joint 10, the bearing race 32 is not securely positioned between the snap ring and the thrust surface 40 of the trunnion 24; if the thrust surfaces 40 and 42 are closely spaced, a space can exist between the bearing race and the snap ring, as shown in FIG. 3, or, if the snap ring is engaging the face 52 of the bearing race, a space can exist between the snap ring and the wall 46 of the groove, while if the thrust surfaces 40 and 42 are relatively widely spaced, then the space between the bearing race and the snap ring and/or between the snap ring and the wall 46 will be correspondingly reduced.

Figure 2:
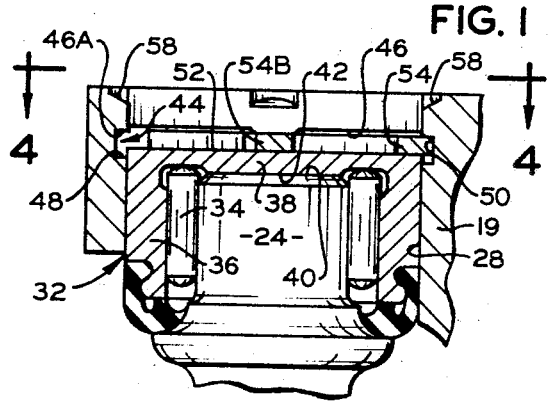
FIG. 2 is an enlarged sectional view of a lug portion of one of the members of the universal joint shown in FIG. 1 and the various elements cooperatively disposed therewith, when such is viewed along the lines 2—2 in FIG. 1.

In order to complete the assembly and thus insure that the bearing race 32 and journal cross 22 are securely positioned with the thrust surfaces 40 and 42 in a closely spaced yet free play relationship, the configuration of the groove 44 is altered. More particularly, at a plurality of locations, portions of the lug 19 about the cross hole 28 therein are deformed in a generally radially inwardly direction as shown at 58. The deformed portions 58 are preferably provided by means of an operation conventionally referred to by the term "staking" and, for this purpose, a tool, shown generally at 60 may be utilized. The upper wall 46A of the groove 44 at the location of the deformed portion 58, see FIG. 2, is thus pressed radially inwardly against the radially outer surface of the snap ring 54 and in turn maintains the bearing race 32 in a position wherein the thrust surfaces 40 and 42 are closely spaced as desired.

In forming the deformed portions 58, it is preferred that the lug 19 is deformed in such a manner that preferably none or at the most a very minimal amount thereof projects into the cross hole 28, for if more than a minimal amount does so extend, such would interfere with a subsequent removal of the bearing race 32 from the cross hole 28. The portion of the cross hole 28 radially outwardly of the groove 44 may be of slightly greater diameter than the diameter of the cross hole radially inwardly of the groove to facilitate the insertion of the bearing race 32 in the cross hole and, additionally, for insuring that during the staking operation, none of the deformed portion projects into an overlying relationship with bearing race 32. In FIG. 3, the tool 60 which is shown disposed coaxially with the radially extending axis of the cross hole 28 is suitable for forming the deformed portions 58 in the preferred manner. More particularly, the tool 60 has a radially extending axis 62 and includes a cylindrical portion 64 which is larger in diameter than the diameter of the cross hole 28 and a second cylindrical portion 66 which is very slightly smaller in diameter than the cross hole 28.

The cylindrical portion 66 is adapted to be pilotingly received by the cross hole 28 and has projecting therefrom in a radial direction with respect to the axis 62, four circumferentially spaced semi-cylindrical portions 68. The radially inner end of each of the projections 68 is angularly relieved approximately 35° with respect to the horizontal, to form an angular staking surface 70, which surface commences a short distance, indicated at 72, from the radially inner end of the cylindrical portion 66. It has been found that by maintaining the angle of the surface 70 at approximately 35°, proper cold working of the metal or staking can be attained without shearing metal from the lug 19 and a minimum staking pressure is required. The angle also tends to stake the metal radially inwardly and also into the lug with little tendency for the deformed portion to enter the cross hole 28. The distance 72 is selected so that the inner end of the cylindrical portion 66 may function as a pilot. Additionally, this distance is preferably controlled so that when the tool 60 has been moved radially inwardly to complete the assembly operation and formation of the deformed portions 58, as shown in FIGS. 1 and 2, the radially inner end of the cylindrical portion 66 engages the radially outer side of the snap ring 54 as a physical stop. Further, the cylindrical portion 66 circumferentially intermediate the projection 68 and radially inward thereof inhibits any portion of the lug 19 from being deformed into the cross hole 28 more than a minimal amount. The amount of staking can thus be controlled by the choice of the distance 72. However, the distance 72 can be made so that the radially inner end of the cylindrical portion 66 does not engage the snap ring 54 and the amount of staking is then controlled by the radially inward load applied to the tool 60.

Preferably, a minimum of four deformed portions 58 are provided thus forming four portions of the groove 44 wherein the upper wall is deformed as at 46A and, in effect, reshaping the upper wall of the groove to a new and more further radially inwardly position. As seen in FIG. 4, with four deformed portions 58 having been provided, no matter how the snap ring 54 is shifted circumferentially a minimum of three of the deformed portions will be in engagement therewith and maintaining the same radially inwardly. If less than four deformed portions 58 were utilized, as for example three, and the snap ring positioned so that only two of such portions were in engagement therewith, more than one-half of the snap ring would be capable of moving radially outwardly against the original upper wall 46 of the groove 44 and thus not properly engage the outer face 52 of the bearing race 32 to position the same.

With the radially inwardly reshaped wall portions 46A of the groove 44 disposed as in the preferred embodiment, the snap ring 54 may be reduced in diameter by conventional manipulation of the legs 54A and 54B thereof thus withdrawing the same from the confines of the groove 44 and from the cross hole 28 so that the bearing race 32 may be pressed radially out of the cross hole to disassemble the universal joint 10. Upon subsequent repositioning of the bearing race 32 in the cross hole 28, the snap ring 54 may again be positioned within the confines of the groove 44 to properly position the bearing race 32.

The space between the outer face 52 of the bearing race 32 and the snap ring 54 prior to completing the assembly thereof, that is in the condition shown in FIG. 3, has been greatly exaggerated for illustration purposes and such normally would be expected to be a maximum of about .010 inch. In the completely assembled condition as shown in FIG. 2, utilizing for example, a lug having a cross hole of approximately one inch and with the outer face 52 of the bearing race 32 engaging the snap ring 54, the distance between the thrust faces 40 and 42 is preferably maintained in a closely spaced yet free play relationship of approximately .002 inch maximum, such being accomplished by controlling the staking operation performed by the tool 60. The tool 60 may be impressed upon the lugs 19 and 20 one at a time while maintaining the other lug and/or the bearing race contained therein stationary; however, two tools 60 may be utilized to deform the lugs 19 and 20 simultaneously. The lugs on the member 20 may then be deformed in a similar manner or other manners of assembly can be utilized for the other member and the trunnion of the journal cross associated therewith.

While only a single embodiment of this invention has been shown and described it is understood that many changes can be made therein without departing from the scope of this invention as defined in the following claims.

What is claimed is:

1. An article of manufacture comprising in combination
   (a) a universal joint member having an axis of rotation and a pair of lug means extending axially therefrom in a radially spaced and aligned relationship,
   (b) journal cross means having at least a pair of radially extending and opposed trunnion means thereon each adapted to be drivingly connected to one of said lug means, (c) said lug means each having a radially extending opening therethrough receiving one of said trunnion means in a spaced relationship, (d) a cup shaped bearing race means having a radially extending circumferential wall disposed in the space between said trunnion means and said lug means and a transversely extending radially outer wall, (e) the radially outer end of said trunnion and the radially inner surface of said transverse wall being adapted as thrust surfaces and disposed in a closely spaced yet free-play relationship, (f) an annular receiving opening formed in the portion of said lug means surrounding the radially extending opening therein and having at least a radially inner wall and a peripheral wall.

(g) the radially inner wall of said annular opening being spaced radially inwardly with respect to the transverse wall of said bearing race means and said peripheral wall having a diameter greater than the diameter of said radially extending opening and extending radially outwardly from said radially inner wall beyond the transverse wall of said bearing race means, (h) a substantially annular ring means capable of being diametrically expanded and compressed and being disposed in said annular receiving opening with the periphery thereof engaging the peripheral wall of said receiving opening and with the radially inner surface of said ring means being spaced radially outwardly from the inner wall of said annular opening and in engagement with the radially outer portion of the transverse wall of said bearing race means, (i) said lug means at a plurality of locations radially outwardly of said ring means being deformed radially inwardly to provide a plurality of radially outer wall means for said annular receiving opening with said outer wall means being in engagement with the radially outer surface of said ring means and maintaining the same in an abutting engagement with the transverse wall of said bearing race means.

2. An article of manufacture as defined by claim 1 wherein said outer wall means are circumferentially spaced and the diameter of the circle defined by the portion of said outer wall means most closely approaching the radial extending axis of the radial opening in said lug means having a diameter at least as great as the diameter of said radially extending opening.

3. An article of manufacture as defined in claim 1 wherein said annular receiving opening is an annular groove, having a radially inner and a radially outer wall and a peripheral wall, the radially outer wall of said groove being disposed radially outwardly from the transverse wall of said bearing race means, said annular ring means is disposed in said annular groove and has a thickness in the radial direction which is less than the distance between the transverse wall of said bearing race means and the radially outer wall of said groove when said thrust faces are in a closely spaced relationship, and said outer wall means are circumferentially spaced portions of said radially outer wall which have been deformed in a radially inward direction into a pressing relationship with the radially outer surface of said ring means.

4. An article of manufacture as defined in claim 3 wherein the portions of said radially outer wall circumferentially intermediate said outer wall means are spaced radially outwardly from said ring means.

5. An article of manufacture as defined in claim 3 wherein said annular groove is positioned in said lug means radially inwardly from the radially outer end of said radially extending opening, said lug means has been deformed radially inwardly by means of an operation commonly referred to as staking, the staking operation having been performed on the portion of said lug means adjacent the radially outer end of said radially extending opening, and the stakingly deformed portions of said lug means deforming portions of the radially outer wall of said annular groove radially inwardly to form said outer wall means.

6. An article of manufacture as defined in claim 3 wherein said plurality of outer wall means comprises at least four circumferentially spaced outer wall means and the portions of said radially outer wall circumferentially intermediate said outer wall means are spaced radially outwardly from said ring means.

7. An article of manufacture comprising in combination
(a) a universal joint member having an axis of rotation and a pair of lug means extending axially therefrom in a radially spaced and aligned relationship,
(b) journal cross means having at least a pair of radially extending and opposed trunnion means thereon each adapted to be drivingly connected to one of said lug means,
(c) said lug means each having a radially extending opening therein receiving one of said trunnions in a spaced relationship,
(d) a cup shaped bearing race means having a radially extending circumferential wall disposed in the space between said trunnion means and said lug means and a transversely extending radially outer wall,
(e) the radially outer end of said trunnion and the radially inner surface of said transverse wall being adapted as thrust surfaces and disposed in a closely spaced yet free-play relationship,
(f) groove means formed in said lug means within the opening thereof and having radially inner and outer walls and a peripheral wall,
(g) the radially outer wall of said groove means being spaced radially outwardly with respect to the transverse wall of said bearing race means,
(h) a substantially annular ring means capable of being diametrically expanded and compressed disposed in said groove means with the periphery thereof engaging the peripheral wall of said groove means, when said thrust surfaces are in a closely spaced relationship the distance between said transverse wall and first portions of said outer wall of said groove means being greater than the radial width of said snap ring,
(i) said lug means being deformed at a plurality of locations adjacent the opening therein in a radially inward direction to deform a plurality of second portions of said groove means radially inwardly and into a pressing engagement with said ring means.

8. A universal joint having a yoke member with a pair of opposed lugs with crossholes therein each mounting a bearing race having the trunnion of a journal cross therein, the bearing races being secured against radially outward movement relative to the lugs by the engagement therewith of snap rings positioned radially outwardly of the bearing races and disposed in an annular receiving opening formed in the lug within the opening thereof, characterized in that said annular opening has a radially inner wall disposed radially inwardly of the radially outer end of said bearing race and that circumferentially spaced portions of each of said lugs surrounding said annular receiving opening and radially outwardly thereof are deformed radially inwardly to form radially outer wall means disposed in discontinuous pressing engagement with the radially outer surface of said snap ring and thus press said snap rings into an abutting relationship with said bearing races and maintain said bearing races in a closely spaced and free-play relationship with said trunnions.

9. A universal joint having a yoke member with a pair of opposed lugs with crossholes therein each mounting a bearing race having a trunnion of a journal cross therein, the bearing races being secured against radially outward movement relative to the lugs by the engagement therewith of snap rings disposed in an annular snap ring groove in the lug formed within the opening thereof characterized in that circumferentially spaced portions of each of said lugs surrounding the opening therein and radially outwardly of said snap ring groove are deformed radially inwardly to decrease the radial width of circumferentially spaced portions of said groove and thus press said snap rings radially inwardly into an abutting relationship with said bearing races and maintain said bearing races in a closely spaced and free-play relationship with said trunnions.

10. A universal joint member according to claim 9 characterized further in that said radially inwardly deformed circumferentially spaced portions of said lugs are spaced circumferentially equally about said opening therein and are at least four in number.

References Cited

UNITED STATES PATENTS

| | | | |
|---|---|---|---|
| 2,032,497 | 3/1936 | Padgett | 64—17 |
| 2,794,693 | 6/1957 | Burkhalter et al. | 64—17 |
| 3,089,717 | 5/1963 | Gair | 287—93 X |
| 3,178,907 | 4/1965 | Lyons | 64—17 |
| 3,230,617 | 1/1966 | Spiess et al. | 29—201 X |

FRED C. MATTERN, JR., *Primary Examiner.*

HALL C. COE, *Examiner.*